US010160296B2

(12) United States Patent
Makita et al.

(10) Patent No.: US 10,160,296 B2
(45) Date of Patent: Dec. 25, 2018

(54) SASH COUPLING STRUCTURE AND METHOD FOR SASH COUPLING

(71) Applicant: SHIROKI CORPORATION, Fujisawa-shi, Kanagawa (JP)

(72) Inventors: Jun Makita, Fujisawa (JP); Yu Okumura, Fujisawa (JP); Hiroshi Enoki, Fujisawa (JP)

(73) Assignee: SHIROKI CORPORATION, Fujisawa-Shi, Kanagawa (JP)

( * ) Notice: Subject to any disclaimer, the term of this patent is extended or adjusted under 35 U.S.C. 154(b) by 86 days.

(21) Appl. No.: 15/314,689

(22) PCT Filed: May 22, 2015

(86) PCT No.: PCT/JP2015/064698
§ 371 (c)(1),
(2) Date: Nov. 29, 2016

(87) PCT Pub. No.: WO2015/182495
PCT Pub. Date: Dec. 3, 2015

(65) Prior Publication Data
US 2017/0203638 A1 Jul. 20, 2017

(30) Foreign Application Priority Data
May 30, 2014 (JP) ................................. 2014-112161

(51) Int. Cl.
*B60J 5/04* (2006.01)
*B23K 101/00* (2006.01)
(Continued)

(52) U.S. Cl.
CPC ....... *B60J 5/0402* (2013.01); *B23K 2101/006* (2018.08); *B23K 2101/185* (2018.08); *B23K 2101/34* (2018.08); *B23K 2103/04* (2018.08)

(58) Field of Classification Search
CPC .... B60J 5/0402; B60J 5/408; B23K 2201/006
See application file for complete search history.

(56) References Cited

U.S. PATENT DOCUMENTS 5,735,081 A * 4/1998 Yamanaka ............. B60J 5/0402
29/897.2
7,707,777 B2 * 5/2010 Takeuchi ............... B60J 5/0402
296/146.5
(Continued)

FOREIGN PATENT DOCUMENTS

JP 2010-12924 A 1/2010
JP 2010-105531 A 5/2010
(Continued)

OTHER PUBLICATIONS

International Search Report (PCT/ISA/210) dated Aug. 11, 2015, by the Japanese Patent Office as the International Searching Authority for International Application No. PCT/JP2015/064698.

*Primary Examiner* — Justin B Rephann
(74) *Attorney, Agent, or Firm* — Buchanan Ingersoll & Rooney PC

(57) ABSTRACT

An object is to provide a sash coupling structure and a method for sash coupling that ensures omission of the process. The sash coupling structure is made such that on a door frame constituted of a column and an upper sash, a coupling cross-sectional surface of the column and a coupling cross-sectional surface of the upper sash are butted together. The column is constituted of a channel member and an inner member. The channel member and the inner member include adhering portions coupled one another along a longitudinal direction. The inner member is plated. A non-adhering portion, which faces a non-not-yet-adhering portion of the inner member, is formed on the channel member at a butted coupling portion.

10 Claims, 6 Drawing Sheets

(51) Int. Cl.
*B23K 101/18* (2006.01)
*B23K 101/34* (2006.01)
*B23K 103/04* (2006.01)

(56) References Cited

U.S. PATENT DOCUMENTS

| | | | | |
|---|---|---|---|---|
| 8,985,673 | B2* | 3/2015 | Yamada | B60J 5/0401 296/146.5 |
| 9,776,480 | B2* | 10/2017 | Yamazaki | B60J 5/0402 |
| 2004/0123526 | A1* | 7/2004 | Hock | B60J 5/0402 49/502 |
| 2006/0123708 | A1* | 6/2006 | Fuetterer | B60J 5/0402 49/502 |
| 2006/0181107 | A1* | 8/2006 | Nishikawa | B60J 5/0402 296/146.2 |
| 2009/0115220 | A1* | 5/2009 | Takeuchi | B60J 5/0402 296/146.6 |
| 2009/0195013 | A1* | 8/2009 | Suzuki | B60J 5/0402 296/146.5 |
| 2011/0011005 | A1* | 1/2011 | Halliwell | B60J 5/0402 49/502 |
| 2011/0099912 | A1* | 5/2011 | Ohtake | B60J 5/0402 49/502 |
| 2014/0021739 | A1 | 1/2014 | Shimizu et al. | |
| 2014/0117707 | A1* | 5/2014 | Yamada | B21D 19/08 296/146.9 |
| 2014/0132028 | A1 | 5/2014 | Yamada et al. | |
| 2014/0137412 | A1* | 5/2014 | Yamada | B60J 5/0402 29/897.2 |
| 2014/0217772 | A1 | 8/2014 | Yamada et al. | |
| 2014/0284961 | A1* | 9/2014 | Otake | B60J 5/0455 296/146.6 |
| 2015/0108785 | A1* | 4/2015 | Yokota | B60J 5/0408 296/146.5 |
| 2016/0031298 | A1 | 2/2016 | Yoshihara et al. | |
| 2016/0167491 | A1* | 6/2016 | Nakaguchi | B60J 5/0402 49/504 |

FOREIGN PATENT DOCUMENTS

| | | |
|---|---|---|
| JP | 2014-19285 A | 2/2014 |
| JP | 2014-94729 A | 5/2014 |
| JP | 2014-151659 A | 8/2014 |
| WO | WO 2014/163133 A1 | 10/2014 |

\* cited by examiner

SASH COUPLING STRUCTURE AND METHOD FOR SASH COUPLING

TECHNICAL FIELD

The present invention relates to, on a door frame constituted of a column, which supports a lateral side portion of a window glass, and an upper sash, which supports an upper side portion of the window glass in a fully-closed state, a sash coupling structure and a method for sash coupling, of an end portion of the column and an end portion of the upper sash.

BACKGROUND ART

Generally, a door sash, which forms a window opening, is integrally disposed on an upper portion of a vehicle door body (an inner panel and an outer panel), which opens and closes a door opening of a vehicle body. The door sash is constituted of a metallic column and a metallic upper sash. An end portion of the upper sash is coupled to an upper end portion of the column of the door sash.

The columns and the upper sash may be constituted of two members: a channel member, which supports a window glass, and an inner member. This inner member is installed on the channel member to form a bag portion in consort with the channel member (e.g., refer to Patent Literature 1).

CITATION LIST

Patent Literature

PATENT LITERATURE 1: JP-A-2010-105531

SUMMARY OF THE INVENTION

Problems to be Solved by the Invention

When a column and an upper sash are constituted of two members, a member positioned outside of a vehicle body may be plated for antirust.

However, when a position where the two members are adhered one another is welded, and moreover, at least one member of the two members is a plated member, plating vapor is generated by welding to cause explosion.

In view of this, a process that chips off a plated layer of the position where the two members are adhered one another to be welded has been required.

The present invention has been made in consideration of the above-described problem. An object of the present invention is to provide a sash coupling structure and a method for sash coupling that ensures omission of the process.

Solution to the Problems

To achieve at least one of the above objects, a sash coupling structure reflecting an aspect of the present invention is a sash coupling structure made such that, on a door frame constituted of a column supporting a lateral side portion of a window glass and an upper sash supporting an upper side portion of the window glass in a fully-closed state, a coupling cross-sectional surface in a direction intersecting with a longitudinal direction of the column and a coupling cross-sectional surface in a direction intersecting with a longitudinal direction of the upper sash are butted together, and the butted parts are welded. At least one member of the column and the upper sash is constituted of: a channel member that supports the window glass; and an inner member that is coupled to the channel member and forms a bag portion in consort with the channel member. The channel member and the inner member include bonded portions bonded one another along a longitudinal direction. The bonded portion of at least one member of the channel member and the inner member has a surface bonded on the other member, the surface being plated. The bonded portions of the channel member and the inner member each include: an adhering portion that adheres to the other member; and an non-adhering portion, a part of the non-adhering portion partially forming a coupling portion of the coupling cross-sectional surface of the column and the coupling cross-sectional surface of the upper sash, the non-adhering portion being not adhering to the other member.

To achieve at least one of the above objects, a method for sash coupling reflecting an aspect of the present invention is a method for sash coupling, on a door frame constituted of a column supporting a lateral side portion of a window glass and an upper sash supporting an upper side portion of the window glass in a fully-closed state. The method includes: butting a coupling cross-sectional surface in a direction intersecting with a longitudinal direction of the column with a coupling cross-sectional surface in a direction intersecting with a longitudinal direction of the upper sash; and welding the butted parts. At least any one member of the column and the upper sash is constituted of: a channel member that supports the window glass; and an inner member that is installed on the channel member and forms a bag portion in consort with the channel member. The channel member and the inner member include bonded portions bonded one another along a longitudinal direction. The method for sash coupling is constituted of: a first process including plating a surface of the bonded portion of at least one member of the channel member and the inner member, the surface being bonded on the other member, forming the bonded portions of the channel member and the inner member such that the bonded portions each include an adhering portion adhering to the other member and a non-adhering portion, a part of the non-adhering portion partially forming a coupling portion of the coupling cross-sectional surface of the column and the coupling cross-sectional surface of the upper sash, the non-adhering portion being not adhering to the other member, installing the adhering portion of the bonded portion of the channel member and the adhering portion of the bonded portion of the inner member, and cutting the channel member and the inner member such that the non-adhering portions partially form the coupling portion to form a cutting surface in a direction intersecting with a longitudinal direction and to form a coupling cross-sectional surface intersecting with a longitudinal direction of the other member of the column and the upper sash; and a second process including butting the coupling cross-sectional surface of the column with the coupling end surface of the upper sash to couple the butted parts by welding.

Other features of the present invention will become more apparent from the following detailed description when taken in conjunction with the accompanying drawings.

Effects of the Invention

According to the sash coupling structure of the present invention, the bonded portion of at least one member of the channel member and the inner member has the surface bonded on the other member, and the surface is plated, and the bonded portions of the channel member and the inner member each include the adhering portion that adheres to the other member and the non-adhering portion, a part of the non-adhering portion partially forming the coupling portion of the coupling cross-sectional surface of the column and the coupling cross-sectional surface of the upper sash, the non-adhering portion being not adhering to the other member, thus eliminating a need for the process that chips off the plated layer of the welded position when the coupling cross-sectional surface of the channel member and the coupling cross-sectional surface of the inner member are butted one another to couple the butted parts by welding. Therefore, the process can be omitted.

The method for sash coupling of the present invention includes the first process including plating the surface bonded on the other member, of the bonded portion of at least one member of the channel member and the inner member, forming the bonded portions of the channel member and the inner member such that the bonded portions each include the adhering portion that adheres to the other member and the non-adhering portion, a part of the non-adhering portion partially forming the coupling portion of the coupling cross-sectional surface of the column and the coupling cross-sectional surface of the upper sash, the non-adhering portion being not adhering to the other member, installing the adhering portion of the bonded portion of the channel member and the adhering portion of the bonded portion of the inner member, and cutting the channel member and the inner member such that the non-adhering portions partially form the coupling portion to form the cutting surface in the direction intersecting with the longitudinal direction and to form the coupling cross-sectional surface intersecting with the longitudinal direction of the other member of the column and the upper sash, thus eliminating a need for the process that chips off the plated layer of the welded position before the second process where the coupling cross-sectional surface of the column and the coupling end surface of the upper sash are butted one another to couple the butted parts by welding. Therefore, the process can be omitted.

Other advantageous effects of the present invention will become more apparent from the following detailed description when taken in conjunction with the accompanying drawings.

DESCRIPTION OF EMBODIMENTS

An embodiment of the present invention will be described using the drawings.

Figure 2:
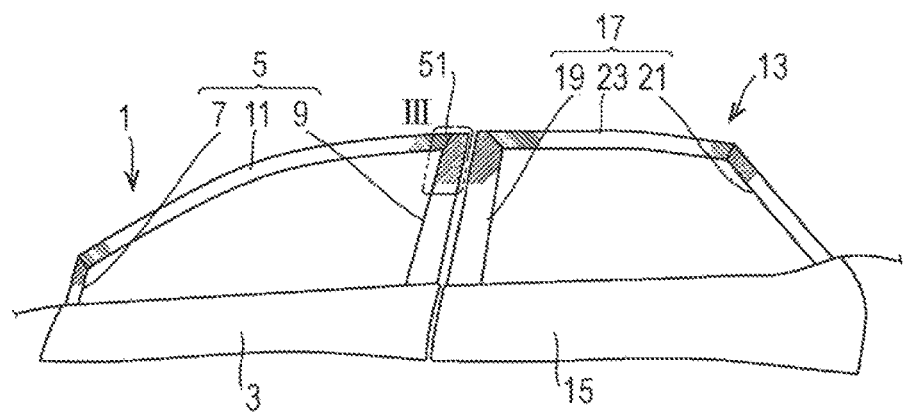
FIG. 2 is a side view of a vehicle including a vehicle door using a sash coupling structure and a method for sash coupling of the embodiment.

First, a vehicle door using a sash coupling structure and a method for sash coupling of the embodiment will be described using FIG. 2. FIG. 2 is a side view of a vehicle including the vehicle door using the sash coupling structure and the method for sash coupling of the embodiment.

A door sash 5, which forms a window opening, is integrally disposed on an upper portion of a door body (an inner panel and an outer panel) 3 of a front door 1. The door sash 5 is constituted of a column (a pillar A) 7, a column (a pillar B) 9, and an upper sash 11. Upper end portions of the column 7 and the column 9, and end portions of the upper sash 11 are butted one another to be coupled.

A door sash 17, which forms a window opening, is integrally disposed on an upper portion of a door body (an inner panel and an outer panel) 15 of a rear door 13. The door sash 17 is constituted of a column (a pillar B) 19, a column (a pillar C) 21, and an upper sash 23. Upper end portions of the column 19 and the column 21, and end portions of the upper sash 23 are butted one another, and the butted parts are welded to be coupled.

Structures and methods for coupling of the respective coupling parts (parts partly hatched in the drawing) are identical. Therefore, the sash coupling structure and the method for sash coupling will be described using the coupling part of the column (the pillar B) 9 and the upper sash 11 of the front door 1 (part III in the drawing).

Figure 1:
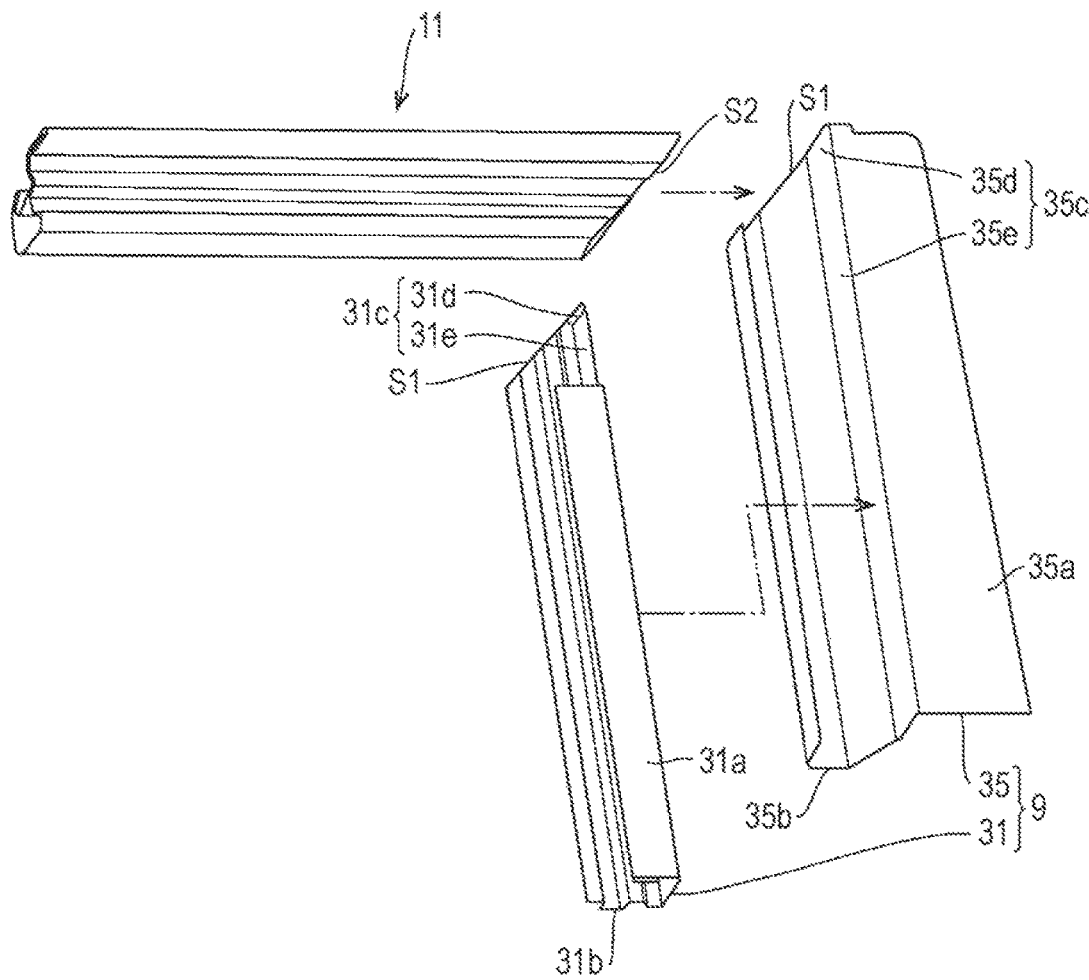
FIG. 1 is an exploded perspective view of a column and an upper sash in FIG. 2.
Figure 3:
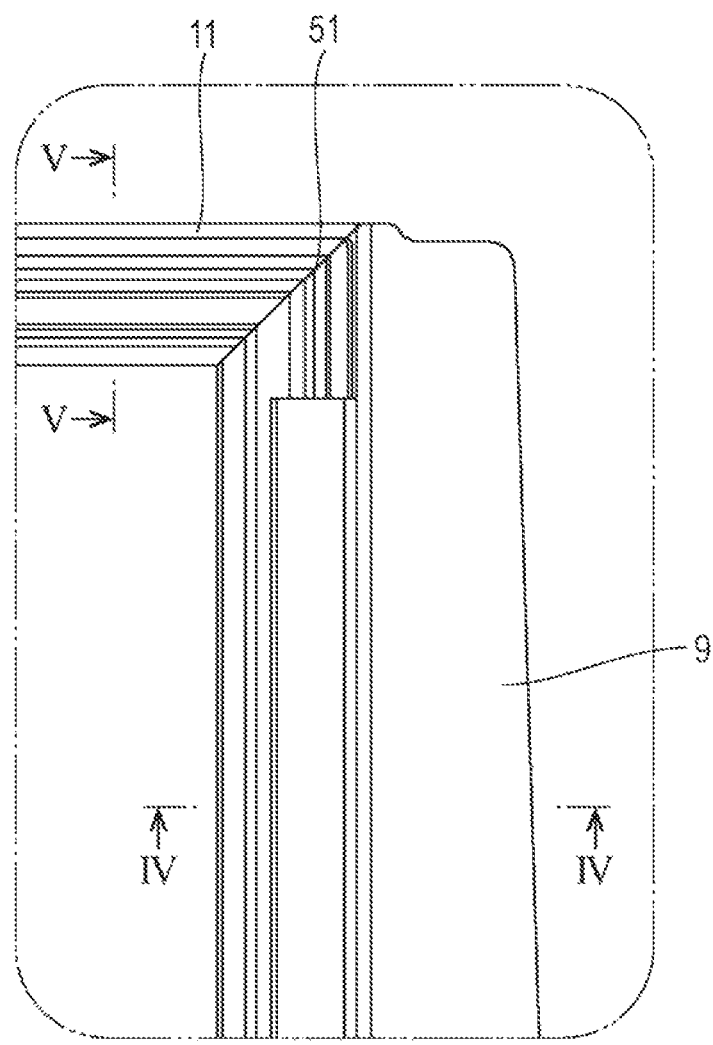
FIG. 3 is an enlarged view of part III in FIG. 2.
Figure 4:
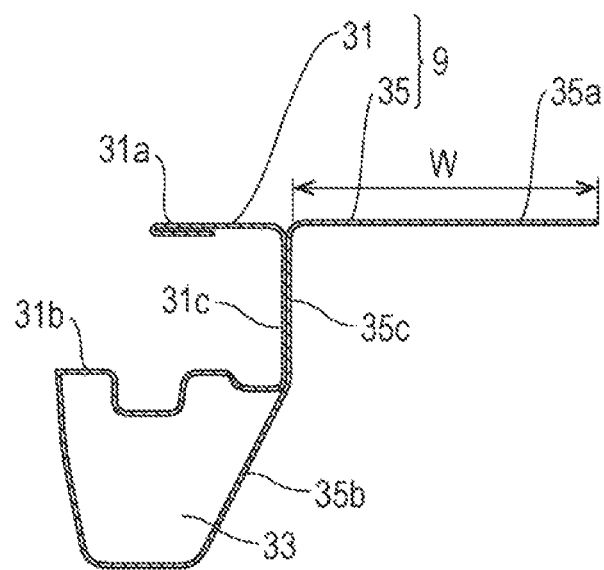
FIG. 4 is a cross-sectional view taken along line IV-IV in FIG. 3.
Figure 5:
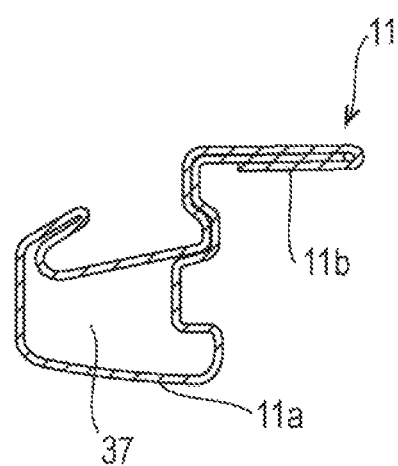
FIG. 5 is a cross-sectional view taken along V-V in FIG. 3.
Figure 6:
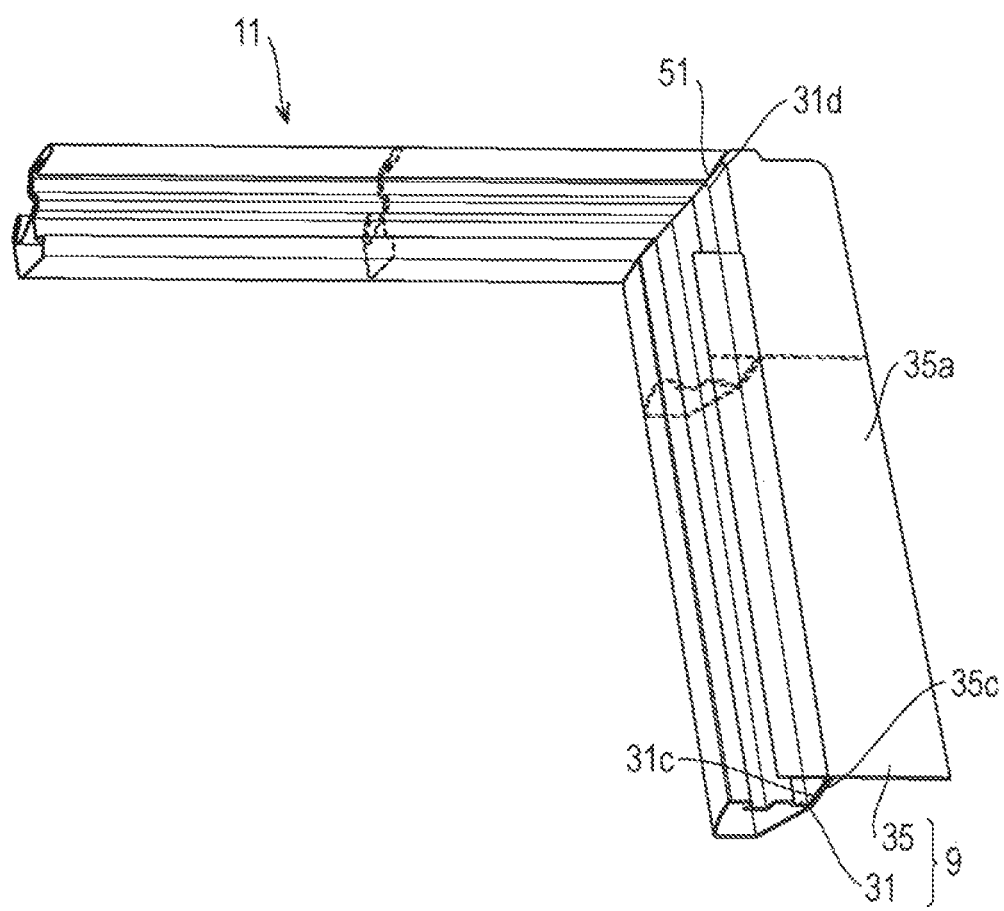
FIG. 6 is a perspective view of the combined components in the exploded perspective view in FIG. 1.
Figure 7:
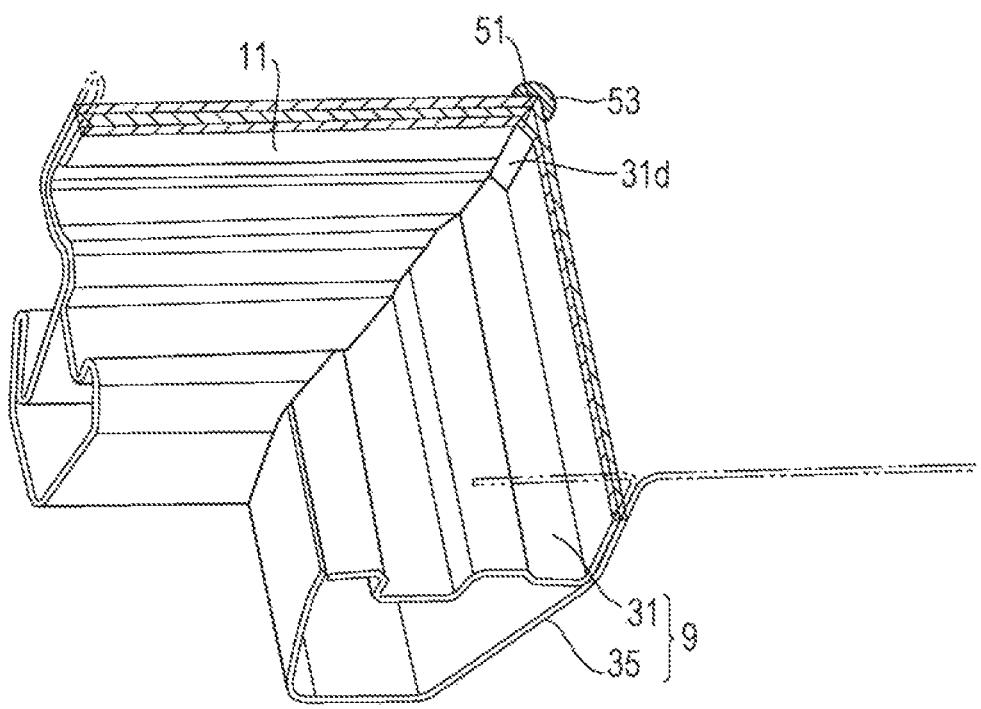
FIG. 7 is a view of a partial cut-away of the components in FIG. 6.
Figure 8:
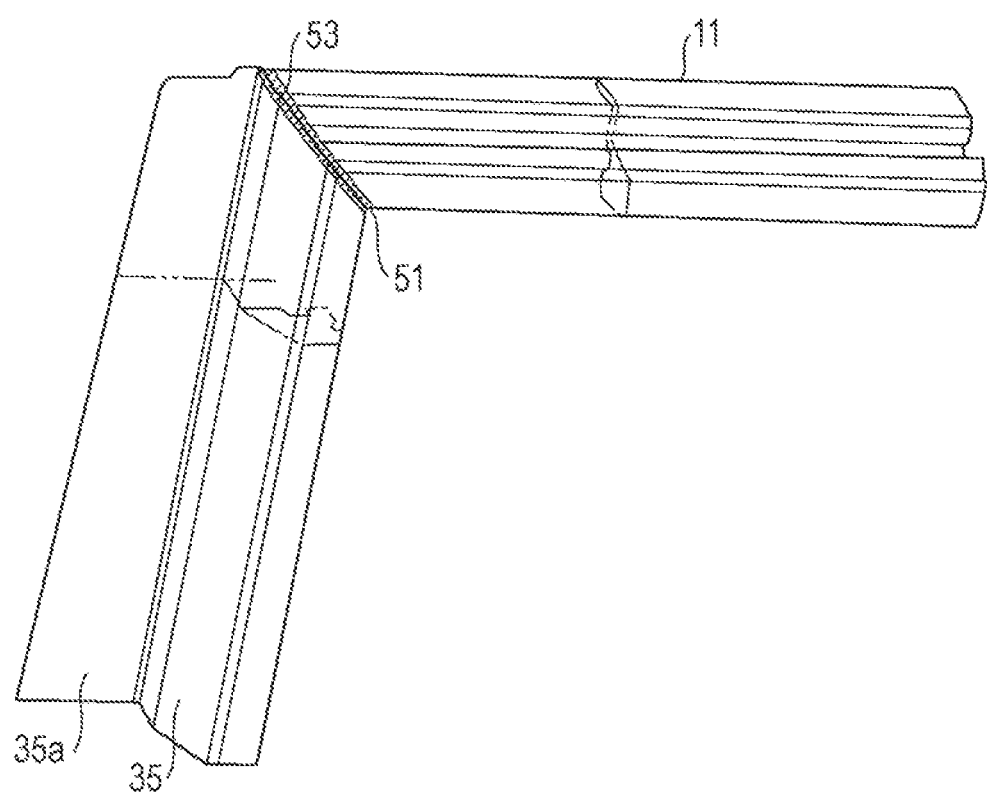
FIG. 8 is a perspective view where the components in FIG. 6 are viewed from an inside of the vehicle.

Here, the column (the pillar B) 9 and the upper sash 11 will be described using FIG. 1, and FIG. 3 to FIG. 8. FIG. 1 is an exploded perspective view where the column and the upper sash in FIG. 2 are viewed from an outside of the vehicle. FIG. 3 is an enlarged view of part III in FIG. 2. FIG. 4 is a cross-sectional view taken along line IV-IV in FIG. 3. FIG. 5 is a cross-sectional view taken along V-V in FIG. 3. FIG. 6 is a perspective view when the components in the exploded perspective view in FIG. 1 are combined. FIG. 7 is a view of a partial cut-away of the components in FIG. 6. FIG. 8 is a perspective view where the components in FIG. 6 are viewed from an inside of the vehicle.

As shown in FIG. 4, the column 9 is constituted of a channel member 31, which supports a window glass, and an inner member 35. The inner member 35 is installed on the channel member 31 and forms a bag portion 33 (hollow portion) in consort with the channel member 31.

The channel member 31 and the inner member 35 in the embodiment are fabricated by roll-forming or press-forming a metal thin plate material.

A galvanizing steel plate is used as the metal thin plate for the inner member 35.

The channel member 31 is constituted of a front side window glass facing portion 31a, which faces a front surface of the window glass to expose outside the vehicle, a back side window glass facing portion 31b, which faces a back surface of the window glass, and a base portion 31c, which faces a lateral end portion of the window glass and is coupled to the front side window glass facing portion 31a and the back side window glass facing portion 31b. A cross-sectional shape of the channel member 31 is an approximately U shape.

The inner member 35 is constituted of a design portion 35a, which exposes outside the vehicle, a bag-portion forming portion 35b, and a communicating portion 35c. The bag-portion forming portion 35b forms the bag portion 33 of a closed cross section in consort with the back side window glass facing portion 31b of the channel member 31. The communicating portion 35c communicates between the design portion 35a and the bag-portion forming portion 35b and adheres to the base portion 31c of the channel member 31.

That is, the base portion 31c of the channel member 31 and the communicating portion 35c of the inner member 35 are bonded portions bonded one another along a longitudinal direction.

In this embodiment, the base portion 31c of the channel member 31 is constituted of an adhering portion 31e, which adheres to the communicating portion 35c of the inner member 35, and a non-adhering portion 31d, which does not adhere to the communicating portion 35c of the inner member 35.

The communicating portion 35c of the inner member 35 in the embodiment is constituted of an adhering portion 35e and a non-adhering portion 35d. The adhering portion 35e adheres to the adhering portion 31e of the channel member 31. The non-adhering portion 35d faces the non-adhering portion 31d of the channel member 31.

A resin garnish for decoration (not illustrated) is mounted on the design portion 35a, which exposes outside the vehicle, of the inner member 35, and the design portion 31a, which exposes outside the vehicle, of the channel member 31.

A cross-sectional shape of the channel member 31 is a uniform cross-sectional shape, except for an upper end portion and a lower end portion.

Furthermore, the inner member 35 is formed such that a width dimension (W illustrated in FIG. 4) of the design portion 35a becomes gradually large toward a below. A cross-sectional shape except for the design portion 35a is a uniform cross-sectional shape, except for an upper end portion and a lower end portion.

As shown in FIG. 5, the upper sash 11 is fabricated by roll-forming a metal thin plate material. The upper sash 11 is constituted of a bag-portion forming portion 11a, which forms a bag portion 37 (hollow portion) of a closed cross section, and a channel portion 11b, which supports the window glass.

A method for coupling the column 9 to the upper sash 11 will be described using FIG. 1.

The adhering portion 31e of the base portion 31c of the channel member 31 and the adhering portion 35e of the communicating portion 35c of the inner member 35, of the column 9 are closely attached one another to be integrated by spot-welding or the like. Before this, an upper end portion of the base portion 31c of the channel member 31 is bended in a direction separating from the communicating portion 35c of the inner member 35. This forms the non-adhering portion (a bended portion) 31d. Simultaneously, a part, which faces the non-adhering portion (the bended portion) 31d of the channel member 31, of the communicating portion 35c of the inner member 35 becomes the non-adhering portion 35d. Furthermore, the front side window glass facing portion 31a at an upper end side of the channel member 31 is notched.

Then, the adhering portion 31e of the base portion 31c of the channel member 31 and the adhering portion 35e of the communicating portion 35c of the inner member 35, of the column 9 are closely attached one another to be integrated by spot-welding or the like.

The channel member 31 and the inner member 35 are cut such that the non-adhering portion (the bended portion) 31d of the channel member 31 and the non-adhering portion 35e of the inner member 35 partially form a coupling portion. This forms a coupling cross-sectional surface S1 in a direction intersecting with the longitudinal direction.

The upper sash 11 is also cut. This forms a coupling cross-sectional surface S2 in a direction intersecting with the longitudinal direction (a first process).

The coupling cross-sectional surface S1 of the column 9 and the coupling cross-sectional surface S2 of the upper sash 11 are butted together. As shown in FIG. 6, FIG. 7, and FIG. 8, both of them are coupled from an outside of a coupling portion 51 by a method such as arc-welding. The coupling cross-sectional surface S1 of the column 9 and the coupling cross-sectional surface S2 of the upper sash 11 are welded in a state abutting one another (a second process).

In FIG. 7 and FIG. 8, a weld bead 53, which is formed on the coupling portion 51, appears.

The above-described structure and method for coupling can obtain the following advantageous effects.

(1) The non-adhering portion (the bended portion) 31d is formed on the base portion 31c of the channel member 31. This eliminates a need for a process that chips off a plated layer of the coupling portion 51 when the coupling cross-sectional surface S1 of the column 9 and the coupling cross-sectional surface S2 of the upper sash 11 are butted together to be coupled by welding. Therefore, the process can be omitted.

(2) The base portion 31c of the channel member 31 and the communicating portion 35c of the inner member 35, of the column 9 are closely attached one another to be integrated by spot-welding or the like. Before this, the non-adhering portion (the bended portion) 31d, which is bended in a direction separating from the communicating portion 35c of the inner member 35, is formed on the upper end portion of the base portion 31c of the channel member 31. This eliminates a need for a process that chips off a plated layer of a welded position. Therefore, the process can be omitted.

(3) The coupling cross-sectional surface S1 of the column 9 and the coupling cross-sectional surface S2 of the upper sash 11 are welded in the state abutting one another. This can prevent from rusting from the coupling cross-sectional surface S1 of the column 9 and the cutting cross-sectional surface S2 of the upper sash 11.

The present invention is not limited to the above-described embodiment.

In the above-described embodiment, a bended portion, which functions as a non-adhering portion, is formed on the base portion 31c of the channel member 31. However, this bended portion may be formed on the communicating portion 35c of the inner member 35.

A bended portion, which functions as a non-adhering portion, is formed. However, this may be a cut-out portion.

Furthermore, two members: a channel member and an inner member may form not the column 9 but the upper sash 11.

Furthermore, the inner member 35 is plated. However, the channel member 31 may be plated.

Furthermore, the inner member 35 uses a galvanizing steel plate as a metal thin plate, thus the whole inner member 35 is plated. However, it is only necessary that at least a surface, which adheres to the base portion (an adhering portion) 31c of the channel member 31, of the communicating portion (an adhering portion) 35c is plated.

This application claims priority from Japanese Patent Application No. 2014-0112161 filed with the Japanese Patent Office on May 30, 2014, the entire contents of which are hereby incorporated by reference.

The above description of a specific embodiment of the present invention is disclosed as illustrative. This does not intend to be exhaustive or limit the present invention to the described embodiments as they are. Many modifications and variations will be apparent to one of ordinary skill in the art in light of the above teachings.

DESCRIPTION OF REFERENCE SIGNS

9: Column
11: Upper sash
31: Channel member
31c: Base portion (adhering portion)
31d: Bended portion (non-adhering portion)
35: Inner member
35c: Communicating portion (adhering portion)

The invention claimed is:

1. A sash coupling structure made such that, on a door frame constituted of a column supporting a lateral side portion of a window glass and an upper sash supporting an upper side portion of the window glass in a fully-closed state, a coupling cross-sectional surface in a direction intersecting with a longitudinal direction of the column and a coupling cross-sectional surface in a direction intersecting with a longitudinal direction of the upper sash constitute butted parts that are butted together and welded, wherein
 the column or the upper sash is constituted of:
  a channel member that supports the window glass; and
  an inner member that is welded to the channel member and that includes a hollow forming portion that forms, together with the channel member, a hollow portion, wherein
 the channel member and the inner member include bonded portions that are bonded to one another
 the bonded portion of the channel member or the inner member has a bonding surface, the bonding surface being a plated bonding surface, and
 the bonded portion of the channel member and the bonded portion of the inner member each include:
  an adhering portion, the adhering portion of the bonded portion of the channel member is adhered to the adhering portion of the bonded portion of the inner member;
  a non-adhering portion, a part of the non-adhering portion partially forming a coupling portion of the coupling cross-sectional surface of the column and the coupling cross-sectional surface of the upper sash, the non-adhering portion of the bonded portion of the channel member being not adhered to the non-adhering portion of the bonded portion of the inner member;
  the non-adhering portion of the bonded portion of the inner member being located at a communicating portion that extends between a design portion of the inner member and the hollow forming portion of the inner member; and
  the non-adhering portion of the bonded portion of the channel member being located at a base portion of the channel member facing the communicating portion.

2. The sash coupling structure according to claim 1, wherein
 the non-adhering portion of the bonded portion of the channel member is a bent portion that is bent in a direction away from the bonded portion of the inner member and the non-adhering portion of the bonded portion of the inner member is a bent portion that is bent in a direction away from the bonded portion of the channel member.

3. The sash coupling structure according to claim 1, wherein
 the non-adhering portion of the bonded portion of the inner member and the non-adhering portion of the bonded portion of the channel member are cut-out portions.

4. The sash coupling structure according to claim 1, wherein
 the coupling cross-sectional surface of the column and the coupling cross-sectional surface of the upper sash abut one another on the coupling portion.

5. The sash coupling structure according to claim 1, wherein
 the channel member includes a front side window glass facing portion facing a front surface of the window glass, a back side window glass facing portion facing a back surface of the window glass, and a base portion coupling the front side window glass facing portion to the back side window glass facing portion, and
 the base portion is the bonded portion of the channel member.

6. The sash coupling structure according to claim 5, wherein
 the inner member includes a design portion, a hollow forming portion that forms, together with the back side window glass facing portion of the channel member, a hollow portion of a closed cross section, and a communicating portion extending between and connecting the design portion and the hollowing forming portion, and
 the communicating portion is the bonded portion of the inner member.

7. The sash coupling structure according to claim 1, wherein
 a front side window glass facing portion at an upper end side of the channel member includes a cut-out portion.

8. The sash coupling structure according to claim 1, wherein the channel member is fabricated by roll-forming.

9. The sash coupling structure according to claim 1, further comprising a weld bead formed on the inner member, the weld bead being located at the butted portions at which the coupling cross-sectional surface in the direction intersecting with the longitudinal direction of the column and the coupling cross-sectional surface in the direction intersecting with the longitudinal direction of the upper sash are butted together.

10. A method for sash coupling, on a door frame constituted of a column supporting a lateral side portion of a window glass and an upper sash supporting an upper side portion of the window glass in a fully-closed state, the method comprising:
 butting and welding a coupling cross-sectional surface in a direction intersecting with a longitudinal direction of the column with a coupling cross-sectional surface in a direction intersecting with a longitudinal direction of the upper sash;
 wherein the column or the upper sash is comprised of:
  a channel member that supports the window glass; and
  an inner member that is installed on and welded to the channel member and that includes a hollow forming portion that forms, together with the channel member, a hollow portion,
 plating a bonding surface of a bonded portion of the channel member or the inner member, forming the bonded portion of the channel member and the bonded portion of the inner member to each include both an adhering portion and a non-adhering portion so that the adhering portion of the bonded portion of the channel member is adhered to the adhering portion of the bonded portion of the inner member while the non-adhering portion of the bonded portion of the channel member is not adhered to the non-adhering portion of the bonded portion of the inner member, a part of the non-adhering portion of the bonded portion of the channel member partially forming a coupling portion of the coupling cross-sectional surface of the column and the coupling cross-sectional surface of the upper sash, the non-adhering portion of the bonded portion of the inner member being located at a communicating portion extending between a design portion of the inner member and the hollow forming portion of the inner member, and the non-adhering portion of the bonded portion of the channel member being located at a base portion of the channel member facing the communicating portion, installing the adhering portion of the bonded portion of the channel member and the adhering portion of the bonded portion of the inner member, and cutting the channel member and the inner member such that the non-adhering portion of the bonded portion of the channel member and the non-adhering portion of the bonded portion of the inner member partially form the coupling portion to form a cutting surface and to form a coupling cross-sectional surface of the other member of the column and the upper sash.

\* \* \* \* \*